United States Patent [19]

Patten et al.

[11] Patent Number: 4,589,772
[45] Date of Patent: May 20, 1986

[54] PULSED REMOTE GAUGE

[75] Inventors: Raymond A. Patten, Oxon Hill, Md.; Jerry A. Blodgett, Annandale, Va.

[73] Assignee: The United States of America as represented by the Secretary of the Navy, Washington, D.C.

[21] Appl. No.: 257,998

[22] Filed: May 25, 1972

[51] Int. Cl.⁴ .................. G01B 9/02; G01B 11/02
[52] U.S. Cl. .................... 356/353; 356/355; 356/357; 356/345
[58] Field of Search .............. 356/106 R, 108, 111, 356/355–358, 353, 5, 28; 250/219 TH

[56] References Cited

U.S. PATENT DOCUMENTS 3,424,532 1/1969 Briggs et al. .................... 356/36
3,709,610 1/1973 Kruegle ......................... 356/355

OTHER PUBLICATIONS

Dotson, Jr. et al.; NASA Tech. Notes D-5515; Nov. 1969; 356-28.5.
Friesen et al.; Appl. Optics; vol. 6, #5; May 1967.

Primary Examiner—S. C. Buczinski
Attorney, Agent, or Firm—Robert F. Beers; William T. Ellis

[57] ABSTRACT

A method for measuring the separation between two spaced light-reflecting surfaces by means of a single laser pulse. The reflected light is divided into two beams which are then projected at the same angle $\theta$ onto the same area on a photographic film to form interference fringes. The film is developed, placed on a translating platform, and passed through the beam of a CW laser, a portion of the beam being diffracted by the interference fringes recorded on the film. The distance $\chi$ between the high-intensity points of adjacent interference regions is measured and the separation of the two light reflecting surfaces is calculated from the formula $d = \chi \sin \theta$.

2 Claims, 3 Drawing Figures

PULSED REMOTE GAUGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to optical measurements and especially to the measurement of the distance between two light-reflecting surfaces by means of a single laser pulse.

Various ways of measuring the separation between two optical surfaces are known. For example, there is a pulsed method using ultra-short pulses of light. If the arrival times of the reflections from the surfaces can be measured with sufficient accuracy, then the surface separation can be found. While picosecond pulses can be generated, timing circuitry limits the resolution of surface separations to the order of a centimeter. The resolution obtainable with the present invention is on the order of 0.4 cm. Higher resolution can be obtained by reducing the coherence length of the pulsed laser source.

The use of a pulsed light source in the measurement of surface separation is of advantage. It enables moving targets to be interrogated; it minimizes problems due to vibrations; and since both reflected light beams return over the same optical path, the technique is suitable for use through the atmosphere provided sufficient energy to expose the film is available.

BRIEF SUMMARY OF THE INVENTION

The objects and advantages of the present invention are accomplished by using a single laser pulse to irradiate a spaced pair of optical surfaces the optical axes of which coincide and separating the reflected light into two beams. The two beams are later overlapped to form interference fringes on a photographic film. The developed film contains interference fringe regions at various positions which can act as diffraction gratings. When exposed to CW laser light, the distance between points of highest intensity diffracted by adjacent interference regions is measured. The separation between the optical surfaces can be calculated from this measurement.

OBJECTS

An object of the invention is to remotely measure the separation between two light-reflecting surfaces.

Another object is to measure the separation between two light-reflecting surfaces by using a single laser pulse.

A further object is to measure the separation between two light-reflecting surfaces which are in motion.

Yet another object is to measure the separation between two remote light=reflecting surfaces which are in motion.

Other objects, advantages and novel features of the invention will become apparent from the following detailed description of the of the invention when considered in conjunction with the accompanying drawings wherein:

DETAILED DESCRIPTION

Figure 1:
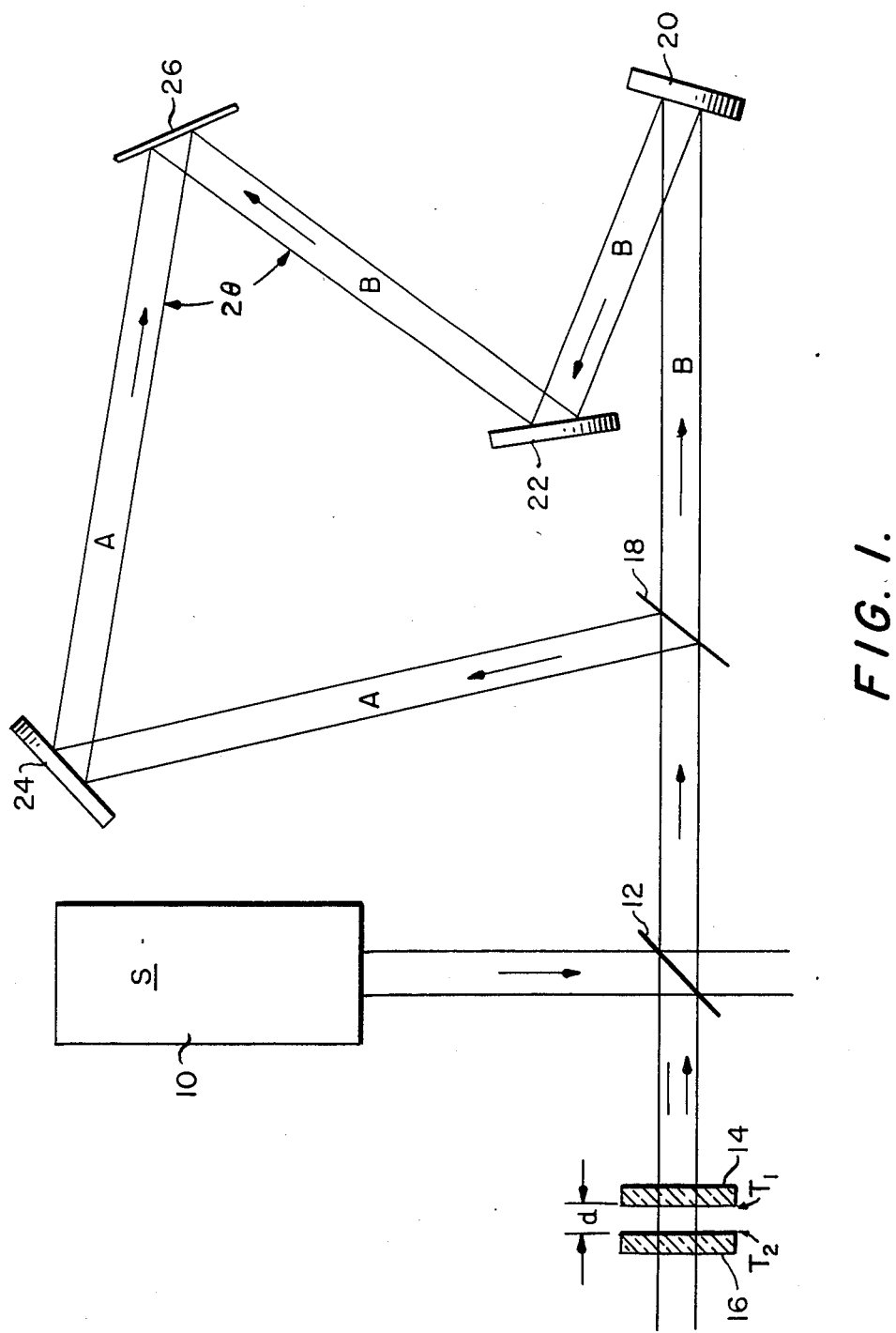
FIG. 1 is a schematic illustration of an embodiment of the recording portion of the invention.

An embodiment of the recording portion of the invention is shown in FIG. 1. A pulsed laser light source 10, for example, a pulsed ruby laser, projects its light onto a beam splitter 12, which reflects part of the light toward the two test surfaces, $T_1$ and $T_2$. It is desired to measure the distance between $T_1$ and $T_2$ and these surfaces must be light-reflecting surfaces. It is also apparent that object 14 must be transparent. Objects 14 and 16 may be a pair of glass plates, for example, whose separation is to be measured. The measurement of separation distance can be made between two or more planar, parallel surfaces and also between two or more curved surfaces, but in the latter case the optical axes of the two curved surfaces the separation of which is being determined must coincide.

Part of the light that is reflected from surfaces $T_1$ and $T_2$ is reflected from beam splitter 18, forming beam A (the arrows show direction of travel of the light) and part passes through the beam splitter 18 to form beam B. These beams are then reflected from mirrors (20, 22, 24) so that the two beams are projected onto the same area of a photographic film 26 at the same angle, $\theta$, to the normal to the film. The two path lengths A and B (from beam splitter 18 to the film 26) must be equal. It does not matter how many beam reflections take place if these conditions (angle and path length) are met and if the left-right orientations of the beam are preserved.

Figure 2:
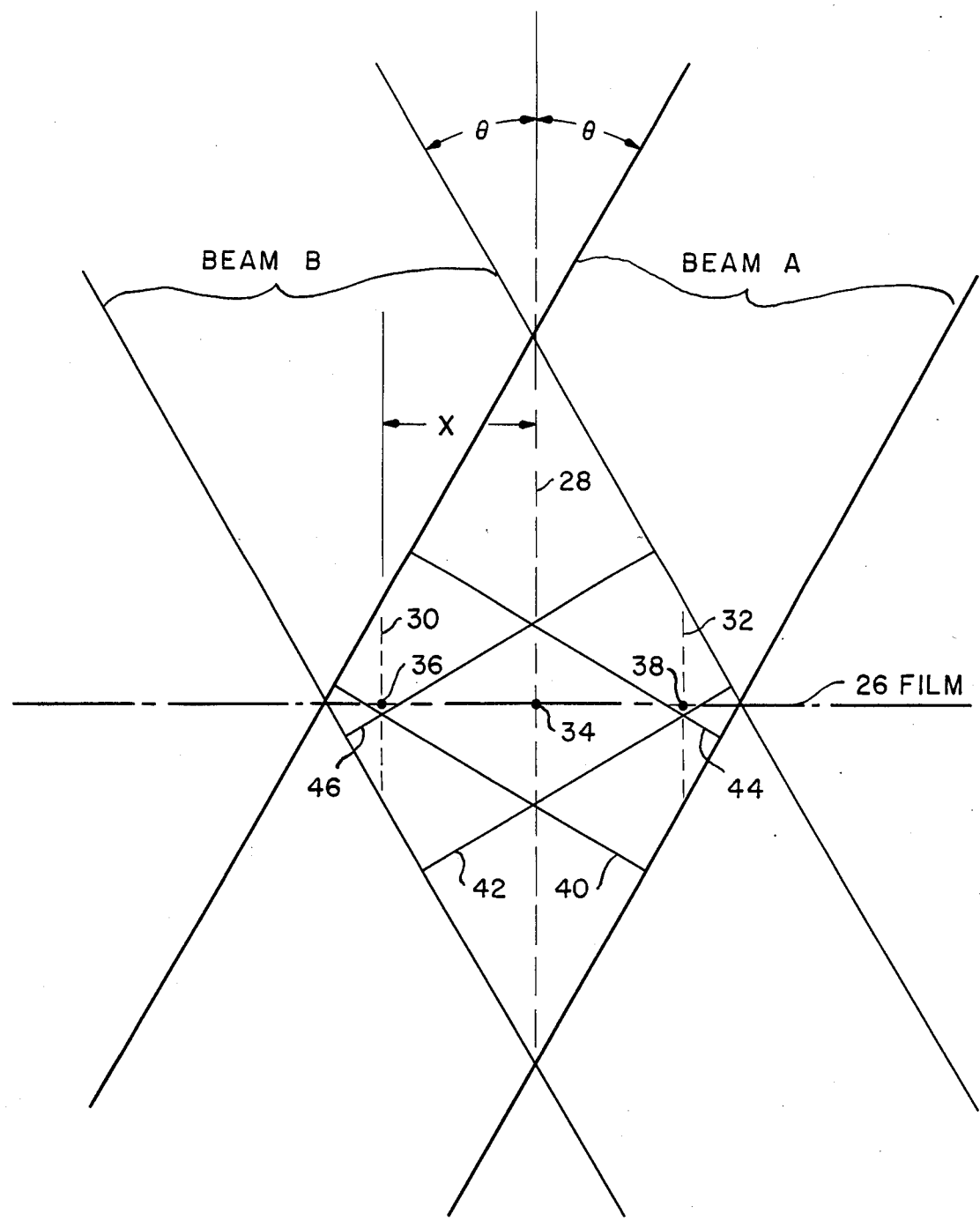
FIG. 2 is a schematic illustration of the wave relations between light beams A and B as they approach the film.

If the optical target consists of two surfaces $T_1$ and $T_2$ separated by a distance, d, a given incident wave front is partially reflected at each surface such that, in the reflected beam, the wave fronts are a distance 2d apart. After passing through the beam splitters and being reflected by the mirrors, the wave fronts in each beam intersect near the film 26 in the manner shown in FIG. 2. The beams A and B come in at an angle, $\theta$, to the normal 28 to the film 26.

The normal 28 to the film 26 is a line of intersection of the wave fronts of the two beams, A and B. Other lines of intersection (30,32) exist. The points 34, 36, 38 at which the lines of intersection make contact with the film 26 are points of highest visibility of the interference fringes which are formed by the two light beams. In the figure, lines 40 and 42 are wavefronts of reflections from the surface $T_1$ and lines 44 and 46 are reflections from surface $T_2$. The distance, $\chi$, is the distance between adjacent interference fringes and the following equation holds:

$$\chi = \frac{d}{\sin \theta} \tag{1}$$

Therefore, $$d = \chi \sin \theta \tag{2}$$

Since the angle, θ, is easily measurable, all that must be measured is the distance χ. This can be obtained from the interference fringes recorded on the film 26, but is not directly obtainable; to the unaided eye, the film is simply a uniform gray color when developed.

Figure 3:
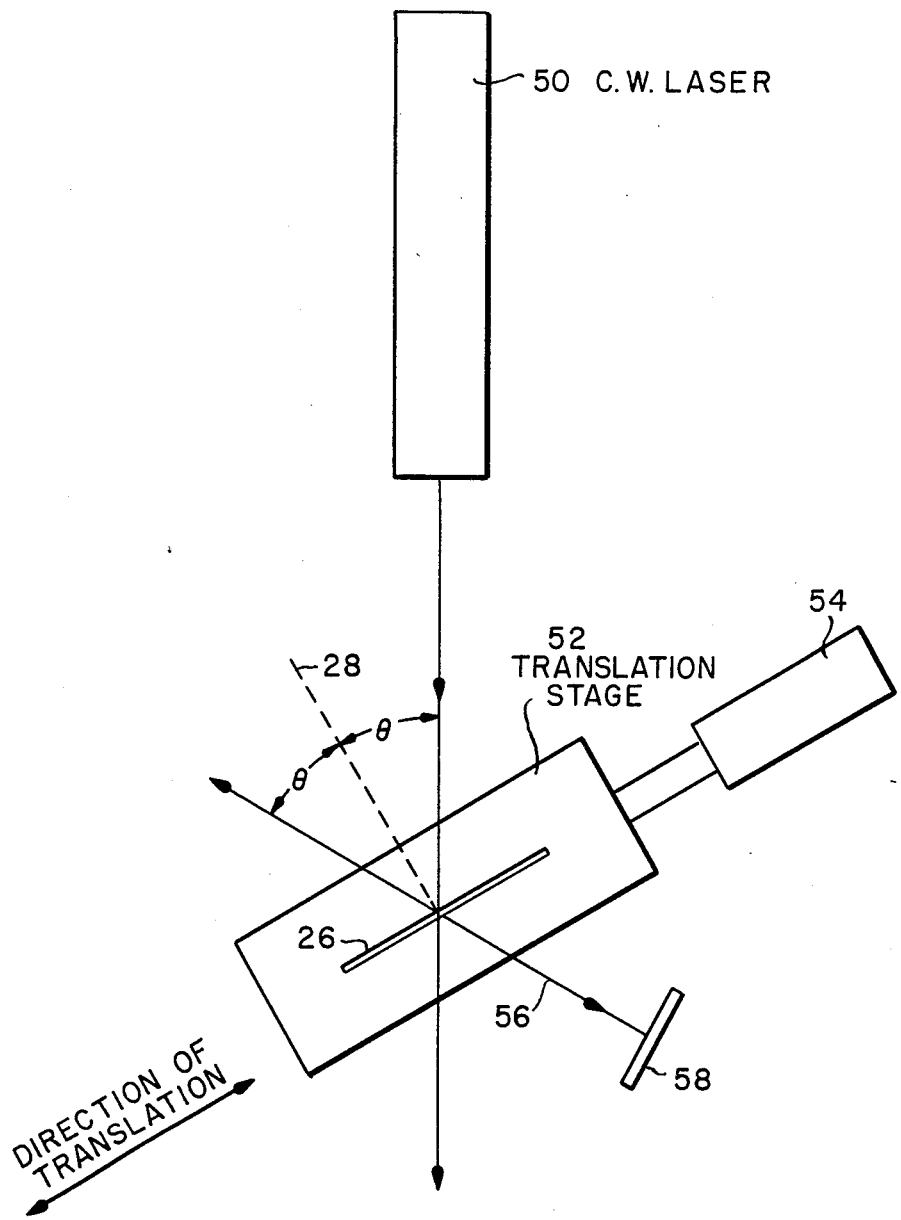
FIG. 3 is a schematic illustration of an embodiment of the interference-fringe measuring portion of the invention.

To obtain the information recorded on the film (i.e., to measure the distance between interference fringes), the apparatus shown in FIG. 3 is used. The film 26 is mounted on a translation platform 52 which is coupled to be driven by a motor 54 (or a rack-and-pinion device could be used). A continuous-wave (CW) laser 50 projects light on the film 26 at an angle, θ, to the normal 28 to the film 26. Part of the light is transmitted through the film, part is reflected at an angle, θ, and part 56 is diffracted (the interference fringes on the film make it act like a diffraction grating) to a light detector 58 which indicates the intensity of the diffracted light and may be a silicon solar cell device, for example. The film 26 is moved to the left or to the right and the distance, χ, between the highest intensity points in adjacent interference patterns is measured. The formula (2) is then used to find the separation distance, d, between the target objects 14 and 16.

The coherence length of the laser 50 can also be found with this apparatus. If the width between the points on the same region of interference where the visibility is reduced to half its peak value is given by W, then the coherence length, L, is given by $$L = \frac{W}{2 \sin \theta} \quad (3)$$

Since the diffracted intensity is proportional to the square of the intensity, this width, W, is also the distance between the quarter intensity points of any interference region.

The output of the light detector can be recorded on a strip chart recorder which records the light intensity vs. time. The output graph looks like a series of spaced hills, the center one being larger in height (maximum intensity) than the side ones. Each hill corresponds to an interference-fringe region. It is quite easy to find the distance, d, between the maximum intensity points by measuring the distance between adjacent maxims (distance between tops of two adjacent hills) on the chart in terms of time and multiplying this value by the rate of travel of the recording paper.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for measuring the separation between two light-reflecting surfaces the optical axes of which coincide using a single laser pulse comprising the steps of:

projecting the laser pulse on said surfaces normal to said surfaces;

separating the reflected light into two beams;

projecting said beams upon the same area of a photographic film, the angles of incidence, θ, of each beam with the normal to the film being equal and known;

developing said film;

irradiating said developed film with CW laser light;

using a light detector to indicate the intensity of the light which is diffracted by the film;

measuring the distance, χ, between the points of highest light intensity between adjacent interference-fringe regions formed by the light which is diffracted by the film; and solving the formula d=χsin θ for the term d, which is the separation between the light-refecting surfaces.

2. A method as in claim 1, wherein said measurement of the distance between the high intensity points is accomplished by moving said film through said CW laser light so that the angle θ made by the normal to the film and the direction of the CW laser light remains constant.

* * * * *